US006792182B1

(12) United States Patent
Davies et al.

(10) Patent No.: US 6,792,182 B1
(45) Date of Patent: Sep. 14, 2004

(54) OPTICAL CROSS CONNECT DEVICE WITH SINGLE GRATING

(75) Inventors: Michael Davies, Ottawa (CA); Orazio Berolo, Ottawa (CA); Bryant Hichwa, Santa Rosa, CA (US)

(73) Assignee: Metrophotonics, Inc. (CA)

( * ) Notice: Subject to any disclaimer, the term of this patent is extended or adjusted under 35 U.S.C. 154(b) by 178 days.

(21) Appl. No.: 10/229,818

(22) Filed: Aug. 28, 2002

Related U.S. Application Data

(60) Provisional application No. 60/315,437, filed on Aug. 28, 2001.

(51) Int. Cl.[7] ................................................. G02B 6/34
(52) U.S. Cl. ............................. 385/37; 385/24; 385/14
(58) Field of Search ............................. 385/37, 14, 24, 385/129–130

(56) References Cited

U.S. PATENT DOCUMENTS

| | | | | |
|---|---|---|---|---|
| 5,206,920 A | * | 4/1993 | Cremer et al. ................. | 385/37 |
| 5,228,103 A | * | 7/1993 | Chen et al. .................... | 385/14 |
| 5,355,237 A | * | 10/1994 | Lang et al. .................... | 385/14 |
| 5,937,113 A | * | 8/1999 | He et al. ....................... | 385/11 |
| 6,011,885 A | * | 1/2000 | Dempewolf et al. .......... | 385/34 |
| 6,271,970 B1 | * | 8/2001 | Wade ........................... | 359/618 |
| 6,275,630 B1 | * | 8/2001 | Yang et al. .................... | 385/37 |
| 6,339,662 B1 | * | 1/2002 | Koteles et al. ................ | 385/24 |
| 6,415,080 B1 | * | 7/2002 | Sappey et al. ................ | 385/37 |
| 6,574,396 B1 | * | 6/2003 | Dragone ...................... | 385/37 |
| 6,591,036 B2 | * | 7/2003 | Okayama ..................... | 385/24 |
| 6,701,043 B2 | * | 3/2004 | Delisle et al. ................ | 385/37 |

OTHER PUBLICATIONS

Herben et al., "Crosstalk Performance of Integrated Optical Cross–Connects", Journal of Lightwave Technology, vol. 17, No. 7, pp. 1126–1134, IEEE, Jul. 1999.

* cited by examiner

Primary Examiner—Ellen E. Kim
(74) Attorney, Agent, or Firm—Jason A. Bernstein; Powell, Goldstein, Fraze & Murphy LLP

(57) ABSTRACT

An optical echelle grating for use with a switching fabric to provide different wavelength switching assemblies such as an optical cross connect. The single grating receives a plurality of multiplexed input optical signals and provides optical signals corresponding to the individual wavelength channels to a switching fabric. The switching fabric routes the signals corresponding to the wavelength channels appropriately and the signals then propagate to the grating once more and are wavelength multiplexed.

22 Claims, 9 Drawing Sheets

Fig. 3    (Prior art)

OPTICAL CROSS CONNECT DEVICE WITH SINGLE GRATING

This application claims priority from copending U.S. provisional application Ser. No. 60/315,437, filed Aug. 28, 2001, the disclosure of which is incorporated herein in its entirety.

FIELD OF THE INVENTION

The invention relates to optical networks and their components. More specifically, the invention relates to optical cross connects for dense wavelength division multiplexing, or DWDM networks.

BACKGROUND OF THE INVENTION

Fibre optic networks allow very large amounts of information to be transmitted accurately over long and short distances. These networks transmit a plurality of optical signals with differing wavelengths into the same fibre to increase the overall bandwidth of the network. Referring to FIG. 1, an optical network is shown wherein a plurality of optical signals with different wavelengths, λ1 to λn, is transmitted from a first node 10 to a second node 12 multiplexed within a same fibre. At the second node 12 the optical signal whose wavelength is λ1 is separated, dropped, and the remainder of the multiplexed signal is transmitted to the third node 13. Thus, this type of optical network has specific destinations serviced by signals at specific wavelengths. This simplifies the optical components tremendously because every signal characterized by a specific wavelength channel exits the network at a predetermined node. Unfortunately, this can also be disadvantageous because the network cannot be reconfigured conveniently. Reconfiguring the network is very beneficial because it allows the network to bypass equipment that is being serviced and it allows the network to boost the available bandwidth between specific nodes when there is a significant fluctuation in the bandwidth requirements between nodes.

Referring to FIG. 2, a configurable optical add/drop multiplexer, or COADM adds flexibility to the network. The COADM 20 has a wavelength dispersive element 21 for separating an optical signal at wavelength λ1 from the received multiplexed optical signals. While it only diverts one signal, in this case at wavelength λ1, it does attenuate all of the optical signals. The wavelength dispersive element 21 is optically coupled to a switch 22. The optical switch 22 can be set to either maintain the one signal within the network or optionally, the one signal is dropped from the network. If the one signal is dropped a new signal at wavelength λ1, within the same wavelength channel as the one signal, is optionally provided. Recombining the optical signals requires a second wavelength dispersive element 23. Similarly, a second COADM 25 is added to control signals at wavelength λ2. As shown in FIG. 2, the second COADM 25 has been set to keep the one signal at wavelength λ2 within the multiplexed optical signal. Unlike a costly router, a COADM is not fast enough to switch individual packets of information, also known as internet protocol packets or IP packets; however, it is fast enough to allow the network to reconfigure itself based upon signal routing requirements. This solution is practical when the number of channels to be dropped is low, because each of the wavelength dispersing elements has a loss that all the optical signals experience. Generally, this approach is not recommend for serially add/dropping more than eight channels at each of more than eight nodes.

When larger numbers of wavelength channels must be added and dropped, an optical cross connect or OCX is used. Referring to FIG. 3, the OCX has two wavelength dispersive elements 31 and 32 in the form of arrayed waveguide gratings (AWGs). The first AWG 31 receives all the optical signals and separates them based upon their wavelength. Signals within each wavelength channel propagate down separate waveguides and into separate switches. The switch used to route each signal may drop it from the network or route it back into the network. The switch 33 is a 2×2 switch, which gives it the ability to substitute an added signal at a same wavelength for an optical signal that is dropped. The OCX shown in FIG. 3 supports only four wavelength channels. The number of wavelength channels that an OCX can support is limited by the quality of the wavelength dispersive elements and the availability of the switches. Since optical signals propagate through the wavelength dispersive elements a maximum of two times the optical attenuation of the device is fairly low. Unfortunately, the OCX is very expensive. The two wavelength dispersive elements are expensive, the switches are expensive and handling the optical fibres during manufacture is time consuming and difficult. Additionally, the characteristics of the signals traveling through the OCX are very dependent on how well matched the two wavelength dispersive elements are one to another. Typically, the exact frequency response of one wavelength dispersive element is not precisely duplicated by any other. Using a tuning method, the frequency response of one such element can be tuned to another. This improves the matching of the two devices but unfortunately it is expensive. Alternatively, devices from a large batch may be tested, evaluated and paired with similarly performing devices. These tests and the handling of the devices is time consuming and require very expensive testing equipment. Additionally, the optical properties of the wavelength dispersive elements are subject to modification due to environmental changes, such as temperature; maintaining same environmental conditions on both wavelength dispersive elements adds to the complexity required to package the device. Clearly, it would be beneficial to have an OCX that is inexpensive, small, and reliable while having good optical properties associated with near perfectly matched wavelength dispersive elements.

SUMMARY OF THE INVENTION

The invention discloses an optical wavelength division multiplexer/demultiplexer device comprising: an input port for coupling a first multiplexed optical signal supporting a first plurality of wavelength channels; a plurality of output ports, each for providing a channelized signal of said first plurality of wavelength channels; a first plurality of input ports, each for coupling a channelized wavelength signal of a second plurality of wavelength channels; a first output port for providing a second multiplexed optical signal corresponding to said second plurality of wavelength channels; a second plurality of input ports, each for coupling a channelized wavelength signal of a third plurality of wavelength channels; a second output port for coupling a second multiplexed optical signal containing said third plurality of wavelength channels; and, an echelle grating disposed for separating the first multiplexed optical signal received from the input port into signals within individual wavelength channels and for directing each into a corresponding output port of the plurality of output ports, for combining a second plurality of signals within corresponding wavelength channels received from the first plurality of input waveguides into a second multiplexed optical signal and for providing the second multiplexed optical signal to first output port, and for combining a third plurality of optical signals within corresponding wavelength channels received from the second plurality of input ports into a third multiplexed optical signal and for providing the third multiplexed optical signal to the second output port.

Additionally, the invention describes an optical wavelength division multiplexer/demultiplexer device comprising: a first input waveguide; a first input port for coupling a first multiplexed optical signal containing a first plurality of wavelength channels to the first input waveguide; a second input waveguide; a second input port for coupling a second multiplexed optical signal containing a second plurality of wavelength channels to the second input waveguide; a first plurality of output ports, each for providing a channelized signal of said first plurality of wavelength channels from the first input port; a second plurality of output ports, each for providing a channelized signal of said first plurality of wavelength channels from the second input port; a first plurality of input waveguides; a second plurality of input waveguides; a first plurality of input ports, each for coupling a channelized wavelength signal of a third plurality of wavelength channels to an input waveguide of the first plurality of input waveguides; a second plurality of input ports, each for coupling a channelized wavelength signal of a fourth plurality of wavelength channels to an input waveguide of the second plurality of input waveguides; a first output waveguide for receiving a third multiplexed optical signal including said third plurality of wavelength channels; a first output port for coupling the third multiplexed optical signal from the first output waveguide; a second output waveguide for receiving a fourth multiplexed optical signal including said forth plurality of wavelength channels; a second output port for providing the fourth multiplexed optical signal from the second output waveguide; and, an echelle grating disposed for separating the first multiplexed optical signal received from the first input waveguide into signals within individual wavelength channels and for directing each to a corresponding output port from the first plurality of output ports, for separating the second multiplexed optical signal received from the second input waveguide into signals within individual wavelength channels and for directing each to a corresponding output port from the second plurality of output ports, for combining a plurality of signals within corresponding wavelength channels received from the first plurality of input waveguides into a third multiplexed optical signal and for providing the third multiplexed optical signal to the first output port, and for combining a plurality of signals within corresponding wavelength channels received from the second plurality of input waveguides into a fourth multiplexed optical signal and for providing the fourth multiplexed optical signal to the second output port.

BRIEF DESCRIPTION OF THE DRAWINGS

Exemplary embodiments of the invention will now be described, in conjunction with the drawings, in which.

DETAILED DESCRIPTION OF THE INVENTION

In order to facilitate the reading and understanding of the following disclosure, same items have been labeled with identical numeral reference throughout the text.

The invention relies on using a single optical grating for the multiplexing and demultiplexing tasks within an OCX. As previously explained, the prior art optical cross connects rely on using a plurality of different wavelength dispersive elements for multiplexing and demultiplexing operations. Certain embodiments of the invention take advantage of compact optical switches such as microelectromechanical systems (MEMS) switches. Other types of switches, such as thermo-optic switches and digital logic switches, will also work with the invention. Preferably the switches are small. When the switches are sufficiently small, they are optionally coupled either directly or indirectly to the optical substrate comprising the single optical grating and in optical communication therewith.

Figure 1:
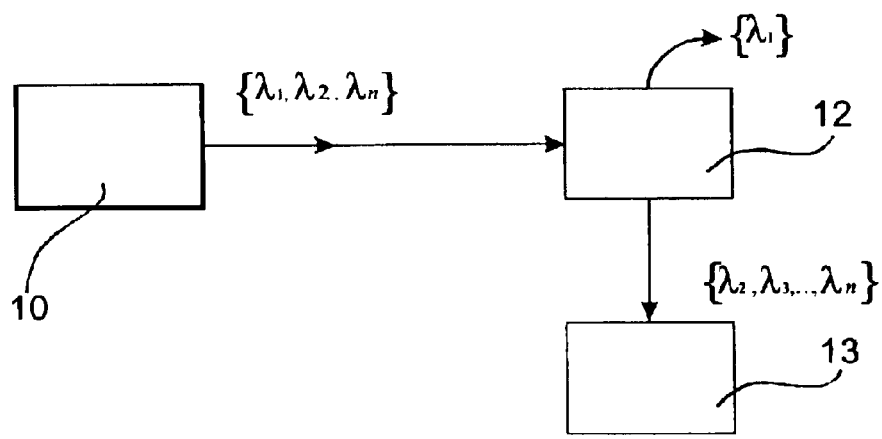
FIG. 1 is a simplified schematic diagram of three nodes in an optical network according to the prior art that drop different wavelength channels from the network.
Figure 2:
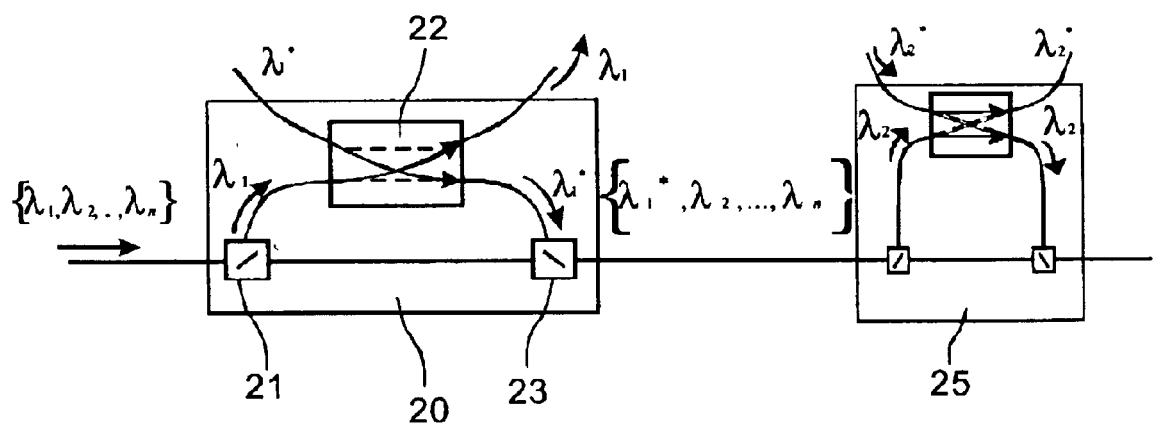
FIG. 2 is a simplified schematic diagram of a prior art configurable add/drop multiplexer.
Figure 3:
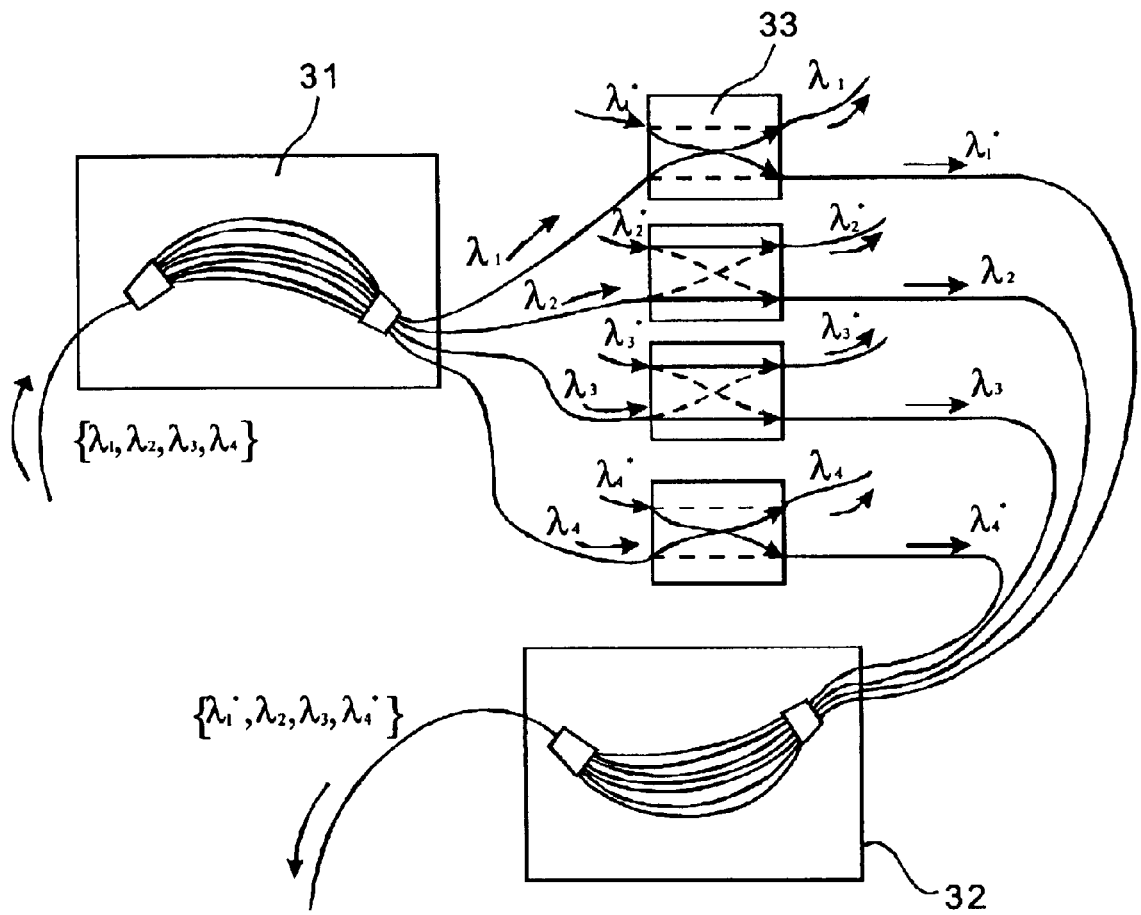
FIG. 3 is a simplified schematic diagram of a prior art optical cross connect featuring two arrayed waveguide gratings and a set of 2×2 optical switches.
Figure 4:
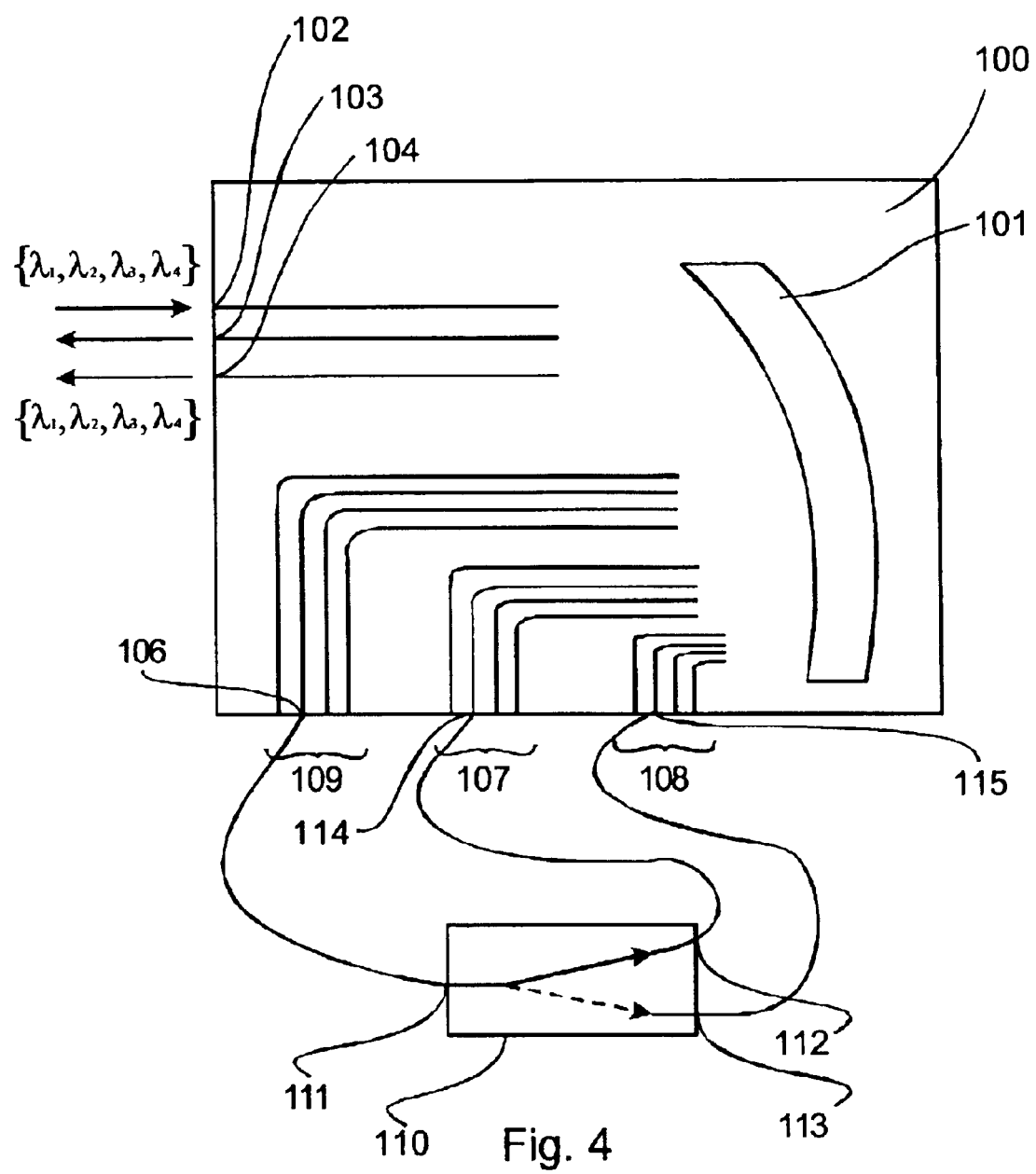
FIG. 4 is a simplified schematic diagram of a simplified embodiment of the invention in which a single switch is optically coupled to a waveguide substrate.

Referring to FIG. 4, in a first embodiment, an optical grating 101 integrated on an optical substrate 100 receives a first set of optical signals from a first input port 102 and provides optical signals at the output ports 103 and 104. Wavelength multiplexed optical signals coupled to the input port are demultiplexed by the grating 101 and provided to a first plurality of waveguides 109. The optical signals present on each of these waveguides correspond to one wavelength channel of the original wavelength multiplexed signal. The optical substrate also has two sets of input ports. Both sets of input ports are for providing optical signals to the optical grating 101. Optical signals provided to the first set of input ports 107 are acted upon by the optical grating 101 and wavelength multiplexed to provide a wavelength multiplexed optical signal to a first output port 103. Similarly, the second set of input ports 108 are optically coupled to the grating for being multiplexed and provided to the second output port 104. An output port 106 from the output ports 103, 104 provides an optical signal to a switch 110. The switch 110 selectively couples light from the switch input port 111 to one of the two switch output ports 112 and 113. The first switch output port 112 is optically coupled to an input port 114 of the first set of input ports 107. Similarly, the second switch output port 113 is optically coupled an input port 115 from the second set of input ports 108. In simpler terms, this embodiment receives a wavelength multiplexed optical signal, separates it into a set of optical signals within predetermined wavelength channels using a dispersive element in the form of an optical grating. One of these signals is coupled to a switch. The switch routes the signal to one of two input ports. The optical connections of this assembly are such that these input ports correspond to the wavelength channel of the optical signal. Thus, if the signal is coupled via the one of the first set of input ports then it is provided at the first output port. If it is coupled via one of the second set of input ports then it is provided at the second output port.

Figure 5:
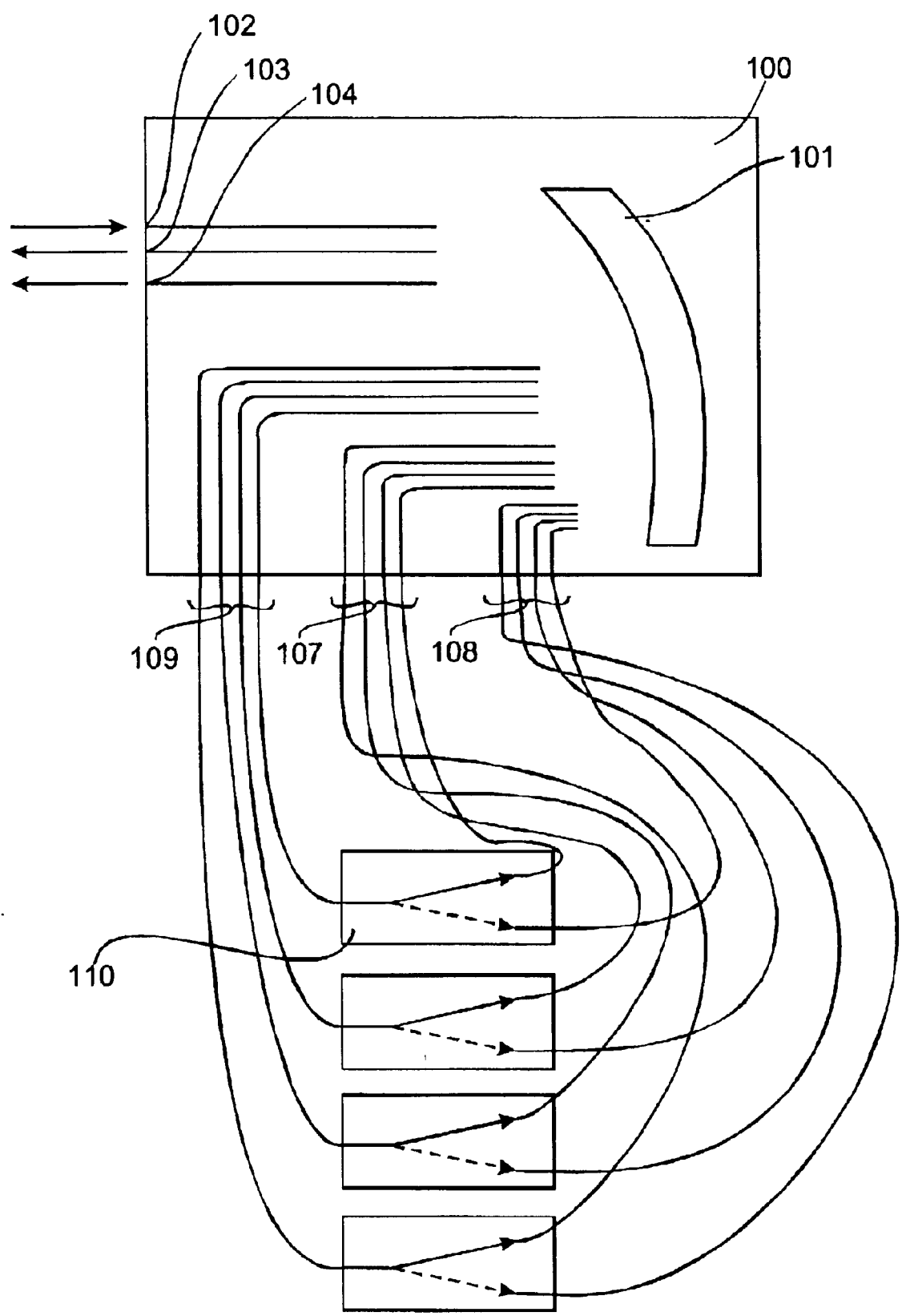
FIG. 5 is a simplified schematic diagram of a simplified embodiment of the invention with four switches optically coupled to a waveguide substrate.

Referring to FIG. 5, a second embodiment of the invention is disclosed. In this embodiment an input port 102 receives a wavelength multiplexed optical signal and provides the demultiplexed optical signals corresponding to predetermined wavelength channels to the plurality of output ports 109. Each of the plurality of output ports 109 is optically coupled to a switch input port of an optical switch 110 of a plurality of switches. Each switch 110 has two switch output ports. These switch output ports are alternately optically coupled to one of the input ports of the two sets of input ports 107 and 108. The optical connections between the optical substrate and the switches 110 are selected such that any output port is optically couplable to either of two input ports to which the switch is coupled, all three optical substrate ports correspond to the same wavelength channel. This embodiment receives one multiplexed optical signal and provides two output optical multiplexed signals. The combination of the component wavelength channels of the two output optical multiplexed signals are substantially equal to the one received multiplexed optical signal. In FIG. 5, this embodiment is illustrated supporting four wavelength channels; however, a person of skill in the art will be aware that this type of device is easily scaled to support more wavelength channels. This embodiment is very advantageous over the prior art OCX because the optical wavelength response of the grating is closely matched for multiplexing and demultiplexing operations, regardless of which state the optical switches are in.

Referring again to FIG. 5, it is apparent that as the number of supported wavelength channels increases the need for organizing the optical connections and increases the need for organizing the fibres connecting the switches to the optical substrate also increases. Currently, systems supporting eighty wavelength channels are available. If the second embodiment is modified to support eighty wavelength channels then it requires two hundred and forty optical fibres to connect the switches to the waveguide substrate. Similarly, if eighty channels are to be supported then eighty switches are required. While an eighty-wavelength channel optical network is unusual at the present time, it is not unlikely that even higher channel count networks will be available in the future.

Of course, it is possible to replace the fibres with waveguides within the substrate if the switches are directly couplable to the optical substrate.

Figure 6:
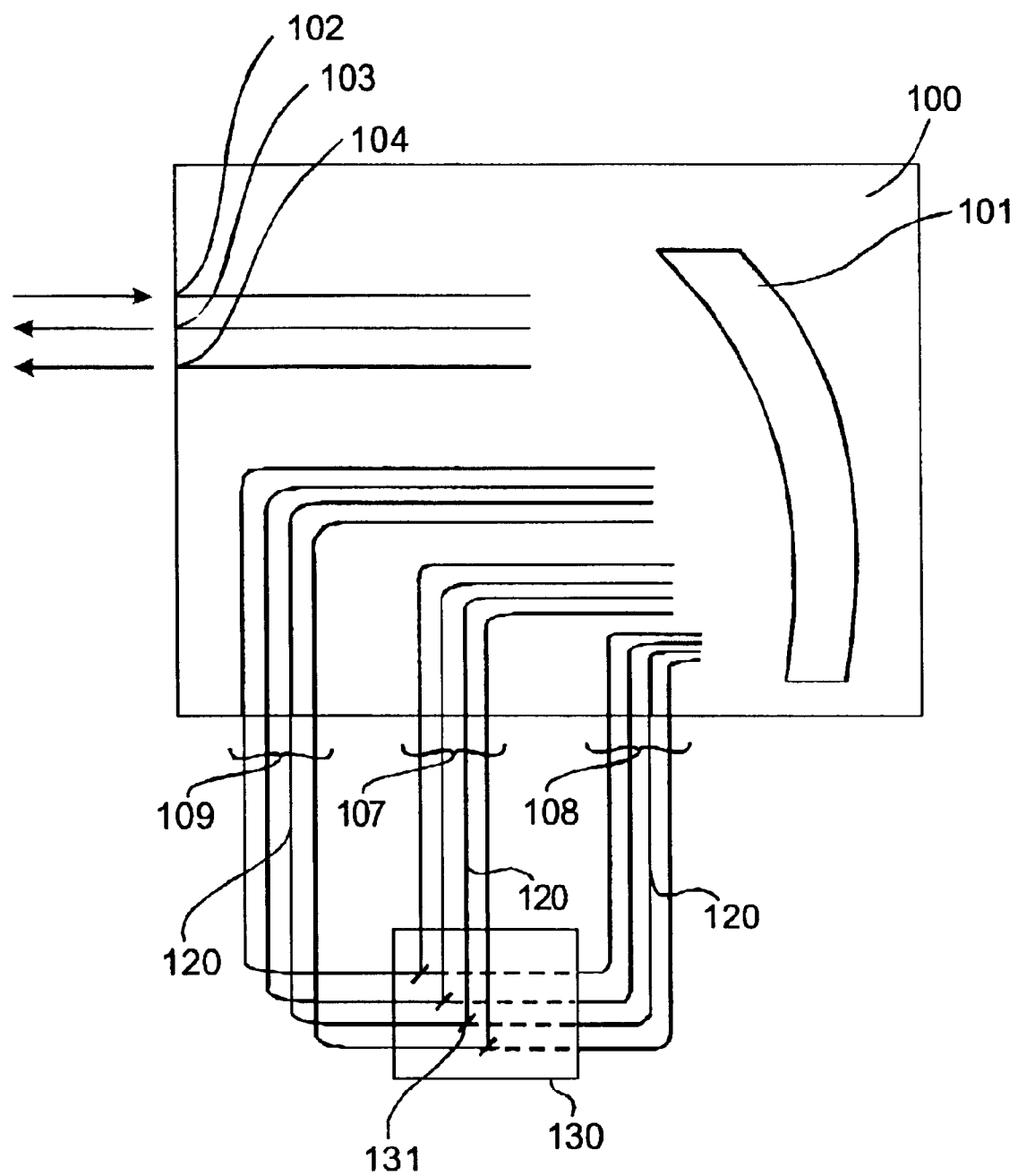
FIG. 6 is a simplified schematic diagram of an embodiment of the invention with a single matrix switch using ribbon fibre for optical coupling with the waveguide substrate.

Referring to FIG. 6, in a third embodiment, which is functionally similar to the second embodiment, the individual switches have been replaced by a single matrix switch 130. An input port 102 receives a wavelength multiplexed optical signal. A dispersive element in the form of an optical grating 101 demultiplexes the optical signals received at the input port 102. The demultiplexed signals are provided at a set of output ports 109. Since all the waveguides used to connect the optical substrate to the switch are routed to the same matrix switch, it is possible to couple them using ribbon fibres 120. Thus there are only three ribbon fibres 120 used to optically couple the matrix switch to the optical substrate 100. The switch routes each individual signal back to the optical substrate at an input port from the two pluralities of input ports 107 and 108. Optical signals received by the two pluralities of input ports 107 and 108 are multiplexed and provided to the output ports 103 and 104, respectively. Generally, a matrix switch is used to connect any one of N input ports to any one of N output ports. However, in this application, the matrix switch is being used to simulate a large number of simpler switches. Consequently, every input port is optically couplable to only two output ports. Therefore, it is possible to incorporate a matrix switch that is otherwise unusable provided the few channels required are in working order. In this embodiment, the matrix switch uses micro-electrical mechanical systems or MEMS mirrors 131 to accomplish the switching task. Clearly, any type of matrix switch with similar functionality may be incorporated.

Figure 7:
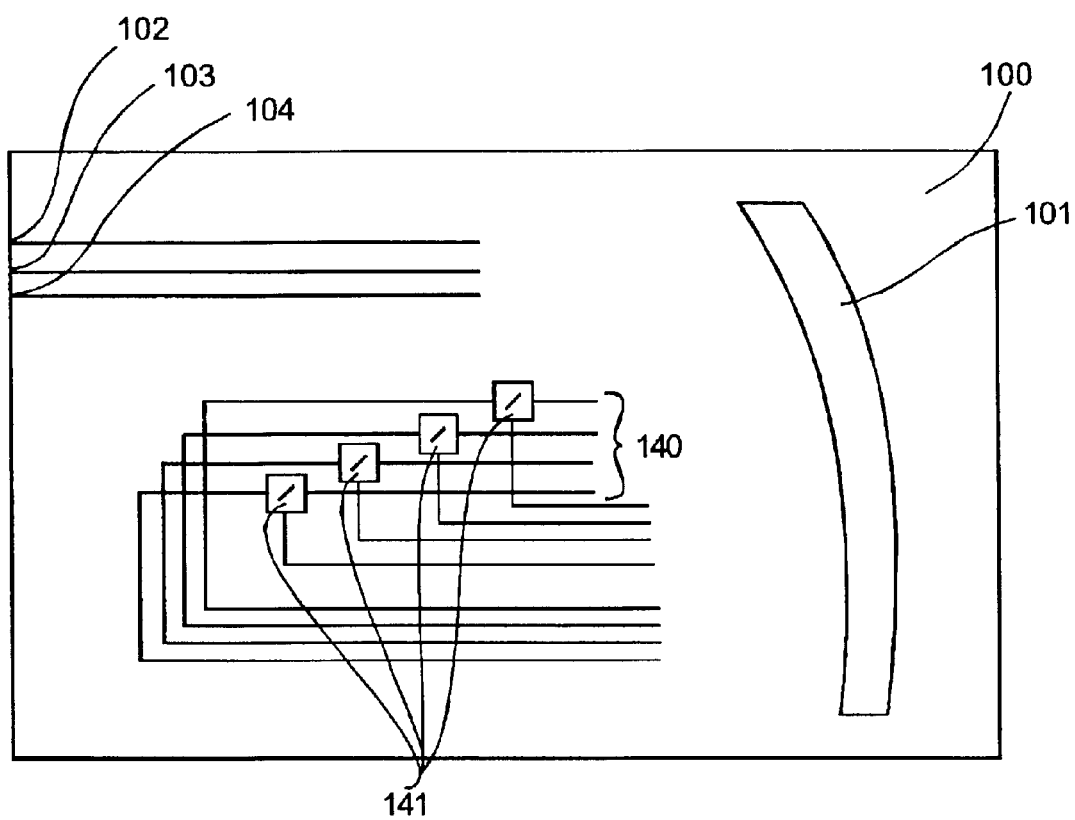
FIG. 7 is a simplified schematic diagram of an embodiment of the invention with four MEMS switches mounted to the substrate.

Referring to FIG. 7, a fourth embodiment of the invention is shown. In this embodiment the input port 102 receives the wavelength multiplexed optical signal and demultiplexes the received signal to the plurality of waveguides 140. Each of the waveguides is optically coupled to an input port of one of a plurality of optical switches 141. Each switch has two output ports. The optical connections between the optical substrate 100 and the switches 141 are predetermined such that any output port is selectively optically coupled to one of two input ports where all three ports correspond to a same wavelength channel on the waveguide substrate. The switches 141 have been miniaturized using MEMS fabrication allowing them to be directly mounted to the optical substrate 100. This eliminates the need for separate waveguides to optically couple the optical substrate to the switches. In this embodiment the grating 101 is an echelle grating and the right angle bends in the waveguides on the substrate indicate the use of turning mirrors. Advantageously, there is no fibre between the optical substrate to the MEMS switches simplifying fabrication, which eliminates many fabrication steps associated with handling and bonding optical waveguides. Additionally, there is no need for the space associated with loops of optical fibre, ordinarily used to connect the substrate to the switch. This allows the finished package to be very compact. Since the switches are attached in such close proximity to the optical substrate it is possible to create a very small hermetic enclosure for the finished device. Additionally, the only fibres penetrating the hermetic seal of the hermetic enclosure correspond to the three ports 102, 103 and 104.

Figure 8:
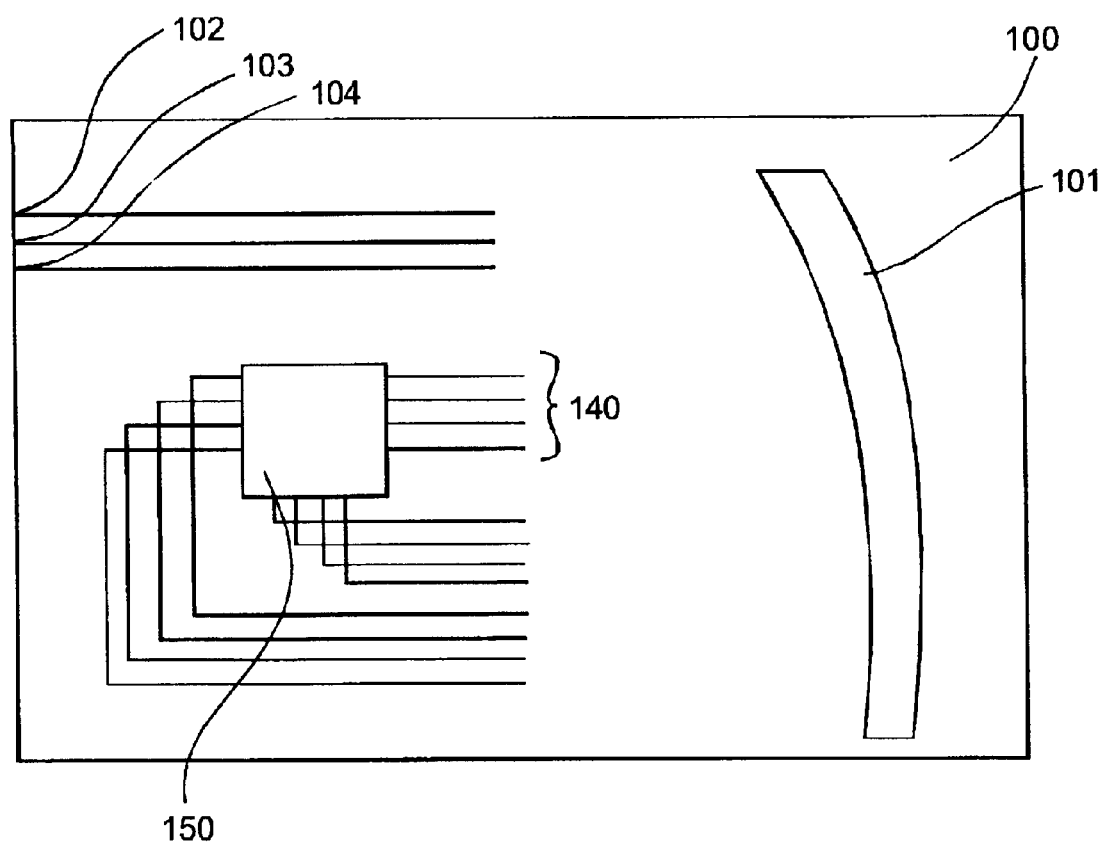
FIG. 8 is a simplified schematic diagram of an embodiment of the invention with a single MEMS matrix switch mounted to a substrate.

Referring to FIG. 8, a fifth embodiment of the invention is shown. This embodiment is characterized by the use of a MEMS matrix switch directly optically coupled to the optical substrate. The input port 102 receives the wavelength multiplexed optical signal and demultiplexes the received signal according to predetermined wavelength channels to provide the demultiplexed optical signals to a plurality of waveguides 140. Each of the waveguides is optically-coupled to an input port of the matrix switch 150. The optical connections between the optical substrate and the switch are predetermined such that any output port is selectively couplable to one of two input ports corresponding to the same wavelength channel on the waveguide substrate. In this embodiment, the matrix switch has been miniaturized using MEMS fabrication allowing it to be mounted to the optical substrate. This eliminates the need for separate waveguides to optically couple the optical substrate to the switch. In this embodiment the grating 101 is an echelle grating and the right angle bends in the waveguides on the substrate indicate the use of turning mirrors. Since the switch is attached in such close proximity to the optical substrate it is possible to create a very small enclosure for the finished device.

Figure 9:
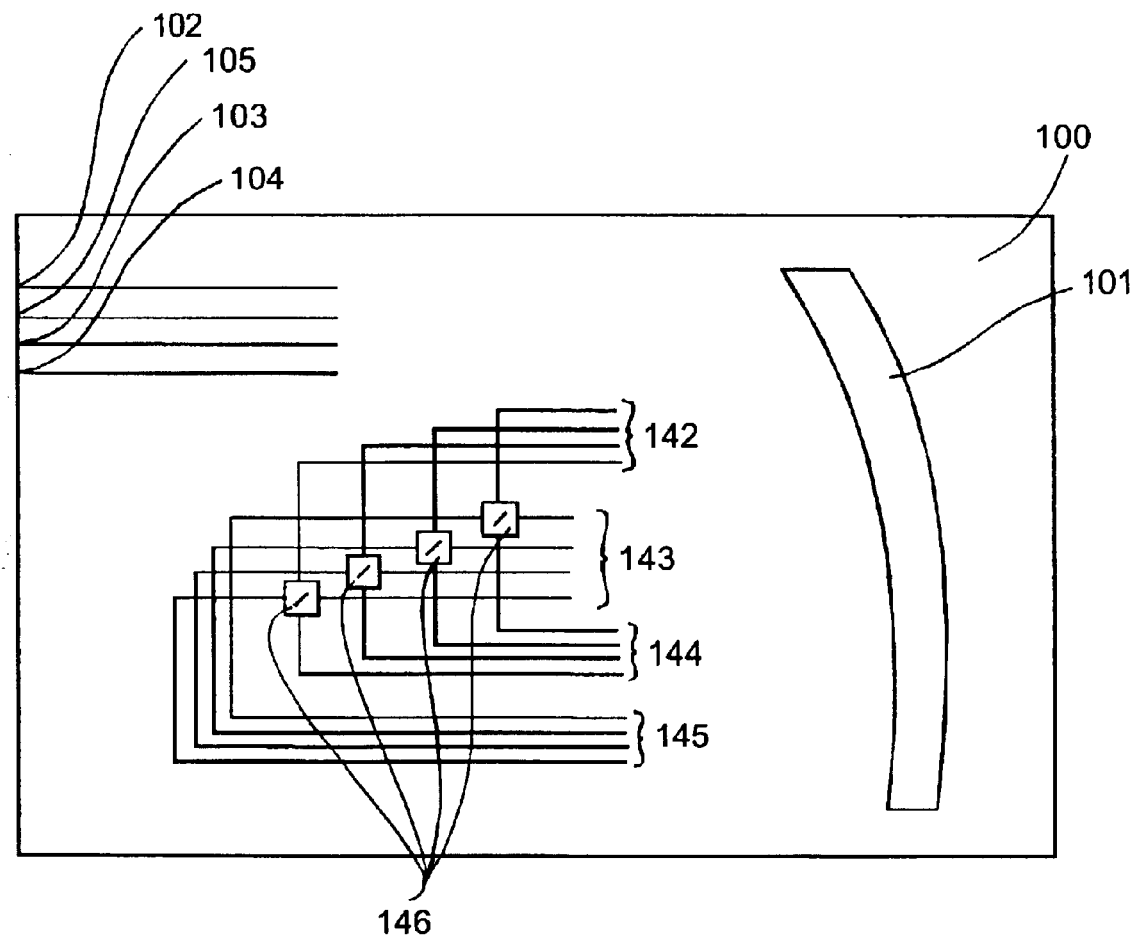
FIG. 9 is a simplified schematic diagram of an embodiment of the invention with four 2×2 MEMS switches mounted to a substrate having two external input ports and two external output ports; and, FIG. 10 is a simplified schematic diagram of an embodiment of the invention with a single matrix switch mounted to a substrate having two external input ports and two external output ports.

Referring to FIG. 9, a sixth embodiment of the invention is shown. This embodiment is characterized by the use of a plurality of 2×2 MEMS switches and a wavelength dispersive element in the form of a grating designed to receive two wavelength multiplexed input signals. The optical substrate 100 receives a first wavelength multiplexed signal at the input port 102. This first signal is provided to a wavelength dispersive element in the form of a grating 101. The grating dispersing it into a first plurality of optical signals where each optical signal corresponds to a predetermined wavelength channel. This first plurality of optical signals propagate within a set of waveguides 142. A second wavelength multiplexed signal is received at an input port 105. This second signal is provided to the grating 101 where it is dispersed into a second plurality of optical signals characterized by the same set of predetermined wavelength channels. This second plurality of optical signals propagates within the waveguides 143. Thus, the two sets of waveguides 142 and 143 support a plurality of pairs of optical signals, each pair within same wavelength channel. These pairs of optical signals, sharing wavelength channels, are each received by a 2×2 MEMS switch 146. Each MEMS switch set in one of two states. In a first state, optical signals presented to the switch propagate directly through it without any change in direction. In a second state, the optical signals are reflected at a right angle. Therefore, every switch receives an input signal at each of two input ports and provides an output signal at each of two output ports. Since both input ports of the switch receive optical signal within a given wavelength channel, the output ports of the switch also provides optical signals within that same wavelength channel regardless of which state the switch is in. The output ports are coupled to individual waveguides with the first plurality of input waveguides 144 and the second plurality of input waveguides 145. The optical signals received by waveguides 144 are provided to the grating 101 and wavelength multiplexed. This first wavelength multiplexed output signal is provided to the output port 103. Similarly, The optical signals by waveguides 145 are provided to the grating 101 and wavelength multiplexed. This second wavelength multiplexed output signal is provided to the output port 104.

The finished device provides the ability to selectively interchange any of the signals within the predetermined wavelength channels of two wavelength multiplexed optical signals. For simplicity this embodiment has been drawn demonstrating only four waveguides within every set. These four waveguides correspond to four wavelength channels. The use of four wavelength channels was chosen for conceptual simplicity and is not intended to limit the maximum number of wavelength channels supported by this embodiment.

Figure 10:
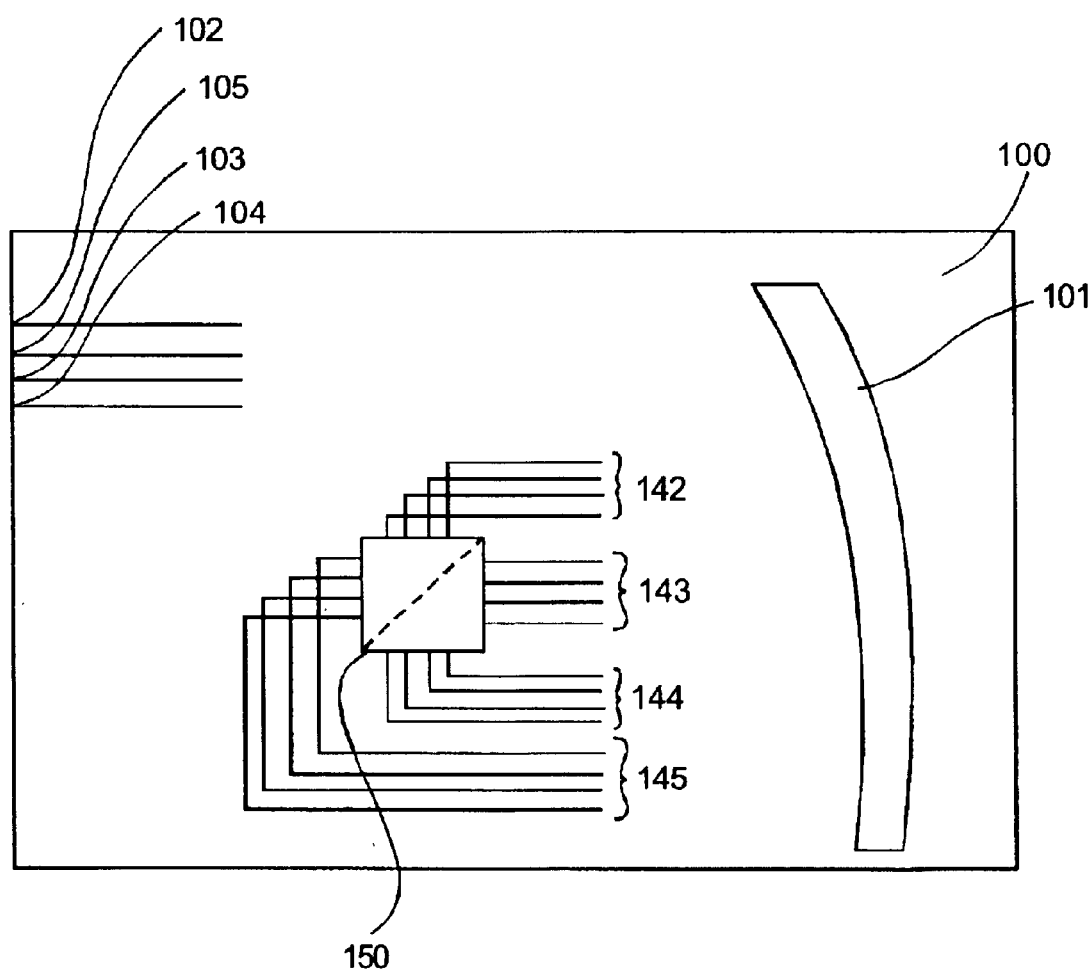

Referring to FIG. 10 a seventh embodiment of the invention is shown. This embodiment is characterized by the use of a single matrix switch and a wavelength dispersive element designed to receive two optical input wavelength multiplexed signals. The optical substrate 100 receives a first wavelength multiplexed signal at the input port 102. This first signal is provided to the wavelength dispersive element in form of a grating 101, dispersing it into a first plurality of optical signals within a set of predetermined wavelength channels. This first plurality of optical signals is received by a set of waveguides 142. A second wavelength multiplexed signal is received by input port 105. This second signal is provided to the grating 101 where it is dispersed into a second plurality of optical signals within the same set of predetermined wavelength channels. This second plurality of optical signals is received by the waveguides 143. Thus, for every predetermined wavelength channel there exists a pair of optical signals, one within the plurality of output waveguides 142 and one within the plurality of waveguides 143. Each of these pairs is optically coupled to an optical matrix switch 150. The matrix switch receives optical signals from two sets of waveguides and provides those same optical signals to two other sets of waveguides 144 and 145. Each of the four sets of waveguides supports the same set of wavelength channels. The switch is set to ensure that only the signals are switched to such that optical signals corresponding to a given wavelength channel are optically coupled to one of the two input waveguides, within the two pluralities of input waveguides 144 and 145, that support that wavelength channel. The optical signals received by waveguides 144 are provided to the grating 101 and wavelength multiplexed. This first wavelength multiplexed output signal is then provided to the output port 103. Similarly, The optical signals received by waveguides 145 are provided to the grating 101 and a second wavelength multiplexed output signal is produced. This second wavelength multiplexed output signal is provided to the output port 104.

Additionally, it will be apparent to those skilled in the art that modifications and alternative embodiments can be made without departing substantially from the teachings of the invention. For example, any limitation to the number of wavelength channels that can be supported is function of the quality of the wavelength dispersing element and the required wavelength channel and, in those embodiments featuring a matrix switch, the maximum number of ports that a matrix switch may have. Similarly, the embodiments have been described with the optical signals propagating in a single direction where in fact the embodiments described may be used bi-directionally.

What is claimed is:

1. An optical wavelength division multiplexer/demultiplexer device, comprising:

a. an input port for coupling a first multiplexed optical signal supporting a first plurality of wavelength channels;

b. a plurality of output ports, each for providing a channelized signal of said first plurality of wavelength channels;

c. a first plurality of input ports, each for coupling a channelized wavelength signal of a second plurality of wavelength channels;

d. a first output port for providing a second multiplexed optical signal corresponding to said second plurality of wavelength channels;

e. a second plurality of input ports, each for coupling a channelized wavelength signal of a third plurality of wavelength channels;

f. a second output port for coupling a second multiplexed optical signal containing said third plurality of wavelength channels; and, g. an echelle grating disposed for separating the first multiplexed optical signal received from the input port into signals within individual wavelength channels and for directing each into a corresponding output port of the plurality of output ports, for combining a second plurality of signals within corresponding wavelength channels received from the first plurality of input waveguides into a second multiplexed optical signal and for providing the second multiplexed optical signal to first output port, and for combining a third plurality of optical signals within corresponding wavelength channels received from the second plurality of input ports into a third multiplexed optical signal and for providing the third multiplexed optical signal to the second output port.

2. The optical wavelength division multiplexer/demultiplexer device of claim 1, wherein the input ports are useable as output ports when the output ports are used as input ports.

3. The optical wavelength division multiplexer/demultiplexer device of claim 1, wherein the echelle grating, the first input port, the first output port, the second output port, the first plurality of input ports, the second plurality of input ports and the first plurality of output ports are disposed on a same integrated substrate.

4. The optical wavelength division multiplexer/demultiplexer device of claim 2, wherein the wavelength channels of the first, second and third plurality of wavelength channels have approximately equal center wavelengths.

5. The optical wavelength division multiplexer/demultiplexer device of claim 2, further comprising:
a switch having a first switch port optically coupled to an output port of the first plurality of output ports, a second switch port optically coupled to one input port of the first plurality of input ports and a third switch port optically coupled to one input port of the second plurality of input ports,
said switch for selectably optically coupling the first switch port to one of the second switch port and the third switch port.

6. The optical wavelength division multiplexer/demultiplexer device of claim 2, further comprising:
a plurality of switches, each switch from the plurality of switches having a first switch port, a second switch port and a third switch port, each of said switches for selectably coupling the first switch port to one of the second switch port and the third switch port,
wherein each of said first switch ports of the plurality of switches is optically coupled to a different output port of the first plurality of output ports, each of said second switch ports of the plurality of switches optically coupled to a different input port of the first plurality of input ports and each of said third switch ports of the plurality of switches is optically coupled to a different input port of the second plurality of input ports.

7. The optical wavelength division multiplexer/demultiplexer device of claim 6, wherein the echelle grating, the first input port, the first output port, the second output port, the first plurality of input ports, the second plurality of input ports and the first plurality of output ports are disposed on a same integrated substrate.

8. The optical wavelength division multiplexer/demultiplexer device of claim 7, wherein each of the switches of the plurality of switches is disposed relative to corresponding input ports of the first and second plurality of input ports and output port of the plurality of output ports such that the selectably optically couplings between each of the plurality of switches and the integrated substrate occurs absent optical waveguides disposed therebetween.

9. The optical wavelength division multiplexer/demultiplexer device of claim 2, further comprising:
a matrix switch having a first plurality of switch ports, a second plurality of switch ports, said matrix switch for selectably coupling at least one switch port of said first plurality of switch ports to at least one switch port of said second plurality of switch ports wherein, at least two switch ports of said first plurality of switch ports are optically coupled to at least two output ports of said first plurality of output ports, at least two switch ports of said second plurality of switch ports are optically coupled to at least two of the input ports of said first plurality of input ports and at least two other switch ports of said second plurality of switch ports are optically coupled to at least two input ports of said second plurality of input ports.

10. The optical wavelength division multiplexer/demultiplexer device of claim 9, wherein the echelle grating, the first input port, the first output port, the second output port, the first plurality of input ports, the second plurality of input ports and the first plurality of output ports are disposed on a same integrated substrate.

11. The optical wavelength division multiplexer/demultiplexer device of claim 10, wherein the matrix switch is disposed relative to corresponding input ports of the first and second plurality of input ports and output port of the plurality of output ports such that the selectably optically couplings between the matrix switch and the integrated substrate occurs absent optical waveguides disposed therebetween.

12. An optical wavelength division multiplexer/demultiplexer device comprising:
a. a first input waveguide;
b. a first input port for coupling a first multiplexed optical signal containing a first plurality of wavelength channels to the first input waveguide;
c. a second input waveguide;
d. a second input port for coupling a second multiplexed optical signal containing a second plurality of wavelength channels to the second input waveguide;
e. a first plurality of output ports, each for providing a channelized signal of said first plurality of wavelength channels from the first input port;
f. a second plurality of output ports, each for providing a channelized signal of said first plurality of wavelength channels from the second input port;
g. a first plurality of input waveguides;
h. a second plurality of input waveguides;
i. a first plurality of input ports, each for coupling a channelized wavelength signal of a third plurality of wavelength channels to an input waveguide of the first plurality of input waveguides;
j. a second plurality of input ports, each for coupling a channelized wavelength signal of a fourth plurality of wavelength channels to an input waveguide of the second plurality of input waveguides;
k. a first output waveguide for receiving a third multiplexed optical signal including said third plurality of wavelength channels;
l. a first output port for coupling the third multiplexed optical signal from the first output waveguide;
m. a second output waveguide for receiving a fourth multiplexed optical signal including said forth plurality of wavelength channels;
n. a second output port for providing the fourth multiplexed optical signal from the second output waveguide; and,
o. an echelle grating disposed for separating the first multiplexed optical signal received from the first input waveguide into signals within individual wavelength channels and for directing each to a corresponding output port from the first plurality of output ports, for separating the second multiplexed optical signal received from the second input waveguide into signals within individual wavelength channels and for directing each to a corresponding output port from the second plurality of output ports, for combining a plurality of signals within corresponding wavelength channels received from the first plurality of input waveguides into a third multiplexed optical signal and for providing the third multiplexed optical signal to the first output port, and for combining a plurality of signals within corresponding wavelength channels received from the second plurality of input waveguides into a fourth multiplexed optical signal and for providing the fourth multiplexed optical signal to the second output port.

13. The optical wavelength division multiplexer/demultiplexer device of claim 12, wherein the input ports are useable as output ports when the output ports are used as input ports.

14. The optical wavelength division multiplexer/demultiplexer device of claim 13, wherein the echelle grating, the first input port, the second input port, the first output port, the second output port, the first plurality of input ports, the second plurality of input ports, the first plurality of output ports and the second plurality of output ports are disposed on a same integrated substrate.

15. The optical wavelength division multiplexer/demultiplexer device of claim 13, wherein the wavelength channels of the first, second, third and fourth plurality of wavelength channels have approximately equal center wavelengths.

16. The optical wavelength division multiplexer/demultiplexer device of claim 13, further comprising:

a switch having a first switch port optically coupled to an output port of the first plurality of output ports, a second switch port optically coupled to an input port of the second plurality of input ports, a third switch port optically coupled to an input port of the first plurality of input ports, and a fourth port optically coupled to an input port of the second plurality of input ports said switch having a first state in which the first switch port is optically coupled to the third switch port and the second switch port is optically coupled to the fourth switch port, and a second state in which the first switch port is optically coupled to the fourth switch port and the second switch port is optically coupled to the third switch port.

17. The optical wavelength division multiplexer/demultiplexer device of claim 13, further comprising:

a plurality of switches, each switch from the plurality of switches having a first switch port, a second switch port, a third switch port, and a fourth switch port, each of said switches having a first state in which the first switch port is optically coupled to the third switch port and the second switch port is coupled to the fourth switch port and a second state in which the first switch port is optically coupled to the fourth switch port and the second switch port is optically coupled to the third switch port, wherein each of said first switch ports of the plurality of switches is optically coupled to a different output port of the first plurality of output ports, each of said second switch ports of the plurality of switches is optically coupled to a different output port of the second plurality of output ports, each of said third switch ports of the plurality of switches is optically coupled to a different input port of the first plurality of input ports, and each of said fourth switch ports of the plurality of switches is coupled to a different input port of said second plurality of input ports.

18. The optical wavelength division multiplexer/demultiplexer device of claim 17, wherein the echelle grating, the first input port, the second output port, the first output port, the second output port, the first plurality of input ports, the second plurality of input ports, the first plurality of output ports and the second plurality of output ports are disposed on a same integrated substrate.

19. The optical wavelength division multiplexer/demultiplexer device of claim 18, wherein each of the switches of the plurality of switches is disposed relative to corresponding input ports of the first and second plurality of input ports and output port of the first and second plurality of output ports such that each of the plurality of switches are optically coupled with the integrated substrate absent optical waveguides disposed therebetween.

20. The optical wavelength division multiplexer/demultiplexer device of claim 12, further comprising:

a matrix switch having a first plurality of switch ports, and a second plurality of switch ports, said matrix switch for selectably optically coupling at least a switch port of said first plurality of switch ports to at least a switch port of said second plurality of switch ports wherein, at least two switch ports of said first plurality of switch ports are optically coupled to at least two output ports of said first plurality of output ports, at least two other switch ports of the first plurality of switch ports are optically coupled to at least two output ports of the second plurality of output ports, at least two switch ports of said second plurality of switch ports are optically coupled to at least two input ports of said first plurality of input ports and at least two other switch ports of said second plurality of switch ports are optically coupled to at least two input ports of said second plurality of input ports.

21. The optical wavelength division multiplexer/demultiplexer device of claim 20, wherein the echelle grating, the first input port, the second output port, the first output port, the second output port, the first plurality of input ports, the second plurality of input ports, the first plurality of output ports and the second plurality of output ports are disposed on a same integrated substrate.

22. The optical wavelength division multiplexer/demultiplexer device of claim 21, wherein the matrix switch is disposed relative to corresponding input ports of the first and second plurality of input ports and output port of the first and second plurality of output ports such that the selectably optically couplings between the matrix switch and the integrated substrate occurs absent optical waveguides disposed therebetween.

* * * * *